United States Patent
Lee et al.

(10) Patent No.: US 10,783,848 B2
(45) Date of Patent: Sep. 22, 2020

(54) DISPLAY DEVICE SUBPIXEL ACTIVATION PATTERNS

(71) Applicant: LG Display Co., Ltd., Seoul (KR)

(72) Inventors: Jongbeom Lee, Paju-si (KR); Beumsik Cho, Goyang-si (KR); Juyun Lee, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 92 days.

(21) Appl. No.: 15/822,591

(22) Filed: Nov. 27, 2017

(65) Prior Publication Data
US 2018/0151145 A1    May 31, 2018

(30) Foreign Application Priority Data
Nov. 29, 2016 (KR) .......... 10-2016-0160285

(51) Int. Cl.
*G09G 3/36* (2006.01)
*G02F 1/1362* (2006.01)
(Continued)

(52) U.S. Cl.
CPC .......... *G09G 3/3685* (2013.01); *G02F 1/1368* (2013.01); *G02F 1/136286* (2013.01);
(Continued)

(58) Field of Classification Search
CPC .. G09G 3/3685; G09G 3/3614; G09G 3/3688; G09G 3/3648; G09G 5/02;
(Continued)

(56) References Cited

U.S. PATENT DOCUMENTS

2001/0050665 A1* 12/2001 Yeo ................ G09G 3/3688
                                                      345/87
2004/0179014 A1   9/2004 Nakano et al.
(Continued)

FOREIGN PATENT DOCUMENTS

CN    103137089 A    6/2013
CN    103426410 A   12/2013
(Continued)

*Primary Examiner* — Amr A Awad
*Assistant Examiner* — Maheen I Javed
(74) *Attorney, Agent, or Firm* — Seed IP Law Group LLP

(57) ABSTRACT

A display device includes a display panel, a data driver, a multiplexer, and a multiplexer controller. First to fourth color subpixels are disposed on the display panel. The data driver outputs a data voltage to be supplied to the first to fourth color subpixels, through output buffers. The multiplexer distributes each of data voltages output by output buffers to four data lines in a time division manner in response to first to fourth control signals. The multiplexer controller sequentially outputs a first control signal to an nth control signal during a first horizontal period, and sequentially outputs the nth control signal to the first control signal during a second horizontal period. The first and second horizontal periods include first to fourth scan periods which are continuous and uniform, and a subpixel receiving a data voltage output during the first scan period of the first horizontal period and a subpixel receiving a data voltage output during the first scan period of the second horizontal period are subpixels of the same color.

14 Claims, 8 Drawing Sheets

(51) Int. Cl.
*G02F 1/1368* (2006.01)
*G09G 5/02* (2006.01)

(52) U.S. Cl.
CPC ......... *G09G 3/3614* (2013.01); *G09G 3/3648* (2013.01); *G09G 3/3688* (2013.01); *G09G 5/02* (2013.01); *G09G 2300/0426* (2013.01); *G09G 2300/0452* (2013.01); *G09G 2310/0291* (2013.01); *G09G 2310/0297* (2013.01); *G09G 2320/02* (2013.01); *G09G 2330/021* (2013.01)

(58) Field of Classification Search
CPC ... G09G 2310/0297; G09G 2310/0291; G09G 2300/0426; G09G 2330/021; G09G 2300/0452; G09G 2320/02; G02F 1/136286; G02F 1/1368
See application file for complete search history.

(56) References Cited

U.S. PATENT DOCUMENTS

| | | |
|---|---|---|
| 2007/0091050 A1 | 4/2007 | Katayama et al. |
| 2008/0278466 A1 | 11/2008 | Joo |
| 2009/0179835 A1 | 7/2009 | Ito |
| 2011/0221787 A1 | 9/2011 | Choi et al. |
| 2013/0141320 A1 | 6/2013 | Kim |
| 2014/0198135 A1* | 7/2014 | Eom .................. G09G 3/3275 345/690 |
| 2015/0380435 A1 | 12/2015 | Li et al. |
| 2016/0078826 A1 | 3/2016 | Yoo et al. |
| 2016/0078836 A1 | 3/2016 | Kim et al. |
| 2016/0093260 A1 | 3/2016 | Watsuda |
| 2016/0189657 A1 | 6/2016 | Oh |
| 2016/0322008 A1 | 11/2016 | Sang et al. |
| 2017/0154561 A1* | 6/2017 | He .................. G02F 1/133512 |
| 2017/0205668 A1* | 7/2017 | Kim ................. G02F 1/133788 |
| 2017/0213509 A1* | 7/2017 | Kim .................... G09G 3/3614 |
| 2017/0358268 A1* | 12/2017 | Nishio ..................... G09G 3/20 |
| 2018/0108304 A1* | 4/2018 | Zhang ................. G09G 3/3677 |

FOREIGN PATENT DOCUMENTS

| | | |
|---|---|---|
| CN | 103869565 A | 6/2014 |
| CN | 104678670 A | 6/2015 |
| CN | 105185326 A | 12/2015 |
| CN | 105590600 A | 5/2016 |
| CN | 105609079 A | 5/2016 |
| CN | 106097988 A | 11/2016 |

* cited by examiner

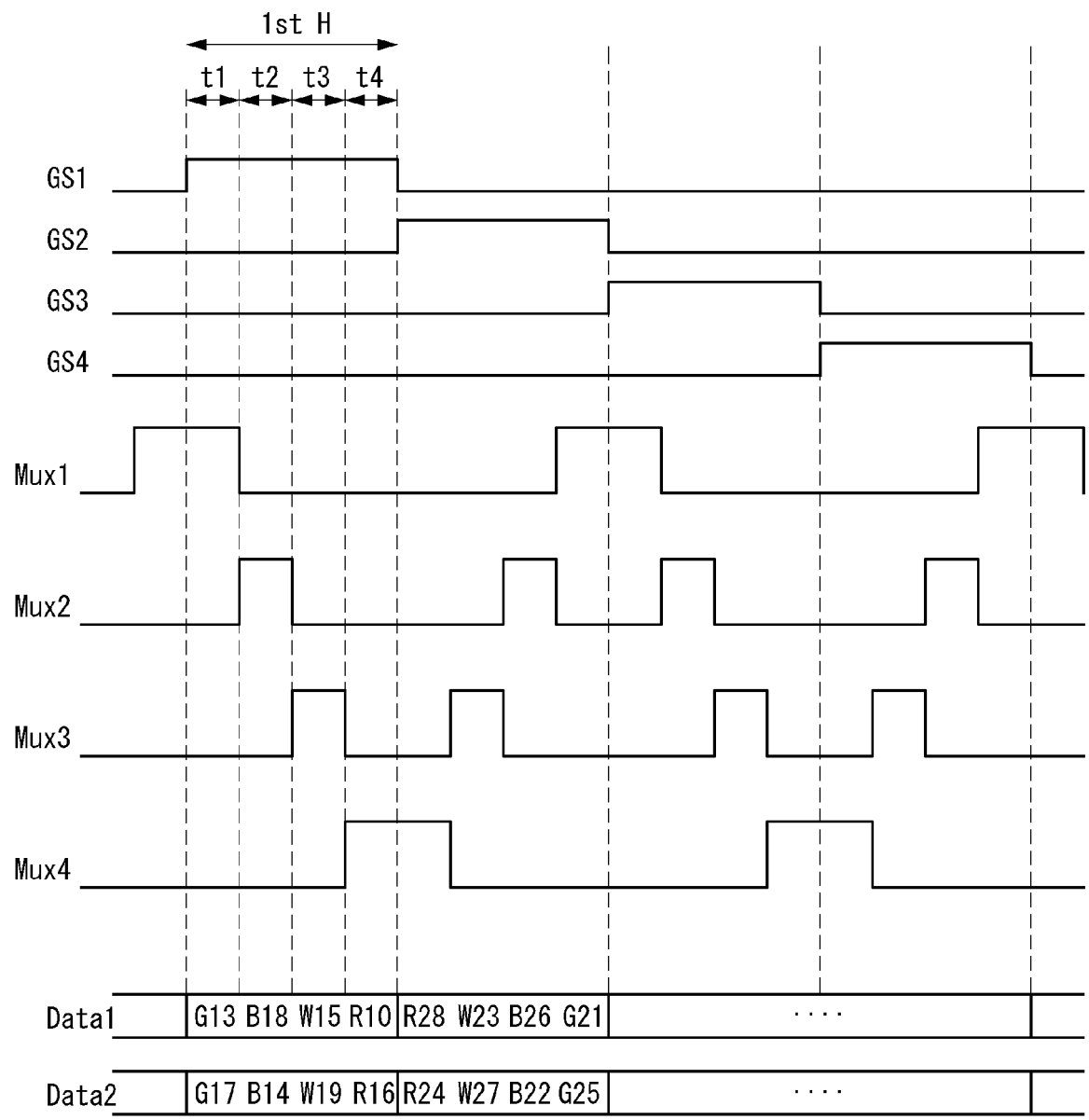

DISPLAY DEVICE SUBPIXEL ACTIVATION PATTERNS

BACKGROUND

This application claims the priority benefit of Korean Patent Application No. 10-2016-0160285 filed on Nov. 29, 2016, which is hereby incorporated herein by reference for all purposes as if fully set forth herein.

TECHNICAL FIELD

The present disclosure relates to a display device consuming less power and having enhanced display quality.

DESCRIPTION OF THE RELATED ART

A flat panel display device includes a liquid crystal display (LCD), a field emission display (FED), a plasma display panel (PDP), an organic light emitting display device, and the like. In a flat panel display device, data lines and gate lines are disposed to intersect with each other, and regions in which a data line and the gate line intersect with each other is defined as a single subpixel. A plurality of subpixels is formed in a panel. In order to drive each subpixel, a video data signal desired to be displayed is supplied to the data lines and a gate pulse is sequentially supplied to the gate lines. The video data signal is supplied to subpixels of a display line to which the gate pulse is supplied, and as all the data lines are sequentially scanned by the gate pulse, video data is displayed.

The video data signal provided to the data lines is generated by a data driver, and the data driver outputs a data voltage through a source channel connected to the data line. In order to reduce the number of source channels, a structure in which a plurality of data lines are connected to one source channel and a data voltage output to the source channel is supplied to the data lines in a time division manner using a multiplexer is used. The multiplexer includes switches selectively connecting the source channel and the plurality of data lines, and the switches are turned on in response to a control signal to connect the source channel and one data line.

As resolution of a display panel is increased, a time period during which a data voltage is supplied to one horizontal line is shortened, and accordingly, an output period of control signals for controlling switches is also shortened. Specifically, a period during which control signals from the multiplexer are reversed from a gate ON voltage to a gate OFF voltage or from a gate OFF voltage to a gate ON voltage is shortened. When reversing of a voltage level of control signals (e.g., transition) very frequently over a short period of time, a circuit section generating the control signal consumes a large amount of power.

BRIEF SUMMARY

According to an aspect of the present disclosure, a display device may include a display panel, a data driver, a multiplexer, and a multiplexer controller. First to fourth color subpixels may be disposed on the display panel. The data driver may output a data voltage to be supplied to the first to fourth color subpixels, through output buffers. The multiplexer may distribute each of data voltages output by the output buffers to four data lines in a time division manner in response to first to fourth control signals. The multiplexer controller may sequentially output a first control signal to an nth control signal during a first horizontal period, and sequentially output the nth control signal to the first control signal during a second horizontal period. The first and second horizontal periods may include first to fourth scan periods which are continuous and uniform, and a subpixel receiving a data voltage output during the first scan period of the first horizontal period and a subpixel receiving a data voltage output during the first scan period of the second horizontal period may be subpixels of the same color.

BRIEF DESCRIPTION OF THE SEVERAL VIEWS OF THE DRAWINGS

The above and other aspects, features, and advantages of the present disclosure will be more clearly understood from the following detailed description taken in conjunction with the accompanying drawings, in which:

FIG. 9 is a view illustrating a timing of control signals according to the third embodiment of the present disclosure.

DETAILED DESCRIPTION

Figure 1:
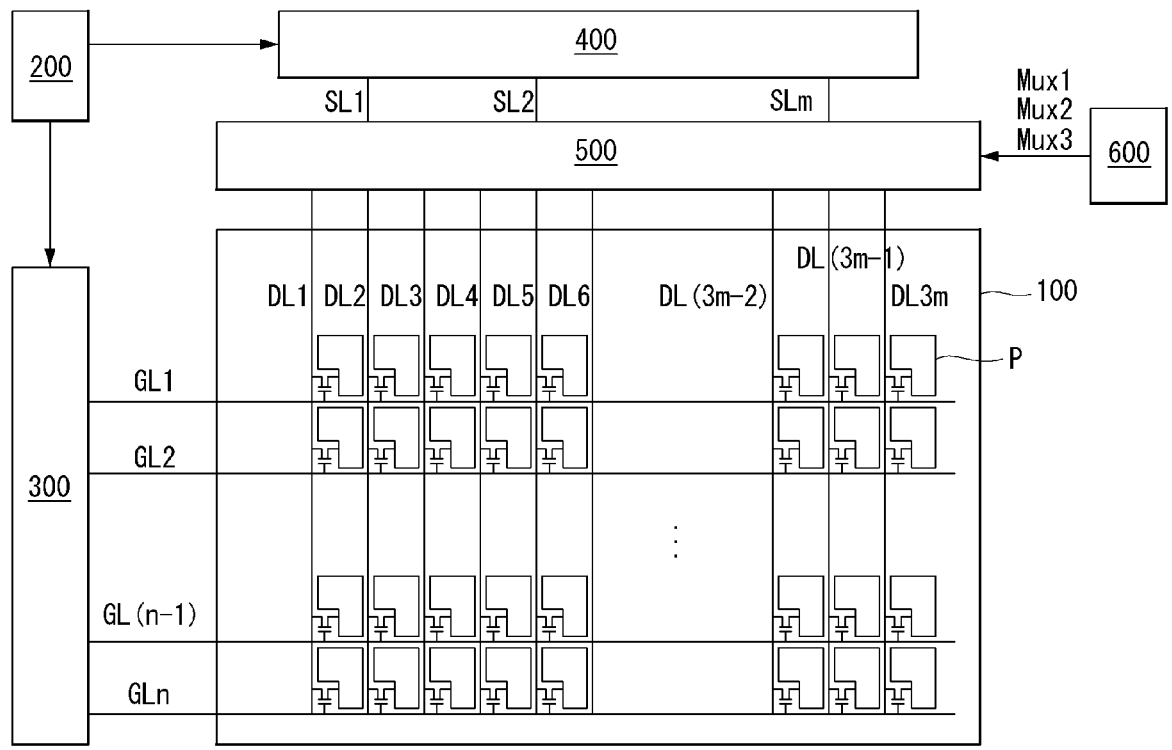
FIG. 1 is a view illustrating a display device according to an embodiment of the present disclosure.

Reference will now be made in detail to embodiments of the present disclosure, examples of which are illustrated in the accompanying drawings. Wherever possible, the same reference numbers will be used throughout the drawings to refer to the same or like parts. In the following description, certain specific details are set forth in order to provide a thorough understanding of various embodiments of the disclosure. However, one skilled in the art will understand that the disclosure may be practiced without these specific details. In other instances, well known structures associated with electronic components and fabrication techniques have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense; that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and the appended claims, the use of "correspond," "corresponds," and "corresponding" is intended to describe a ratio of or a similarity between referenced objects. The use of "correspond" or one of its forms should not be construed to mean the exact shape or size.

The present disclosure is directed to a display device with a set control signal timing. The display device includes color subpixels that are driven according to a set of control signals from a multiplexer. The multiplexer can provide various patterns of control signals, and in one embodiment provides gate control signals in a first sequence and then in a second sequence opposite the first sequence. This may result in reduced switching time and power as no gate signal switching is done at the beginning and end of the sequence.

In a gate driver of the present disclosure, switches may be implemented as transistors having a structure of n-type or p-type metal oxide semiconductor field effect transistors (MOSFETs). In the embodiments described hereinafter, an n-type transistor will be described, but the present disclosure is not limited thereto. For example, other types of transistors (e.g. P-type MOSFETs, BJTs, and TFETs) or other types of switches may also be used. In the present disclosure, outputting control signals refers to a state in which the corresponding control signals are in a gate ON voltage state. That is, gate ON voltage of the switches as n type transistors correspond to a high potential voltage and outputting or applying control signals refers to a state in which corresponding control signals are in a high potential voltage state.

Figure 2:
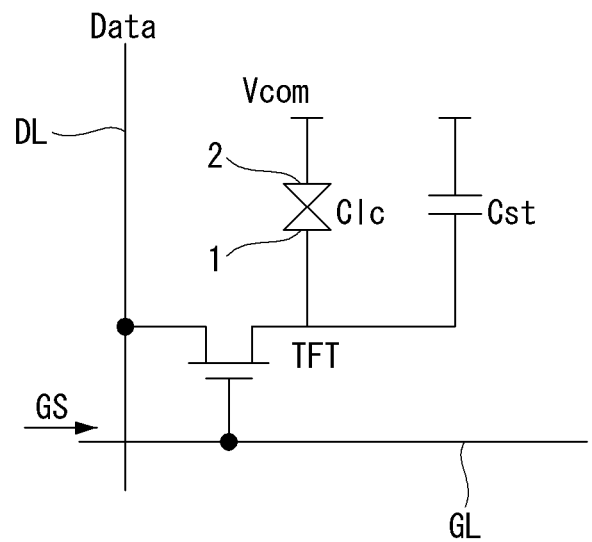
FIG. 2 is a view illustrating an example of a subpixel illustrated in FIG. 1.

FIG. 1 is a view illustrating a display device according to an embodiment of the present disclosure, and FIG. 2 is a view illustrating an example of a subpixel illustrated in FIG. 1.

Referring to FIGS. 1 and 2, the display device of the present disclosure includes a display panel 100, a timing controller 200, a gate driver 300, a data driver 400, a multiplexer 500, and a multiplexer controller 600.

The display panel 100, including a subpixel array in which subpixels are disposed in a matrix form, displays input image data. As illustrated in FIG. 2 the subpixel array includes a thin film transistor (TFT) array formed on a lower substrate, a color filter array formed on an upper substrate, and liquid crystal cells Clc. The TFT array includes a data line DL and a gate line GL crossing the data line DL, a TFT formed at a crossing between the data line DL and the gate line GL, a subpixel electrode 1 connected to the TFT, a storage capacitor Cst, and the like. The color filter array includes a black matrix and a color filter. A common electrode 2 may be formed on the lower substrate or upper substrate. Liquid crystal cells Clc are driven by an electric field between the subpixel electrode 1 to which a data voltage is supplied and the common electrode 2 to which a common voltage Vcom is supplied.

The timing controller 200 may receive digital video data RGB from an external host and receives timing signals such as a vertical synchronization signal Vsync, a horizontal synchronization signal Hsync, a data enable signal DE, a main clock CLK, and the like. The timing controller 200 transmits the digital video signal RGB to the data driver 400. The timing controller 200 generates a source timing control signal for controlling an operation timing of the data driver 400 using the timing signals Vsync, Hsync, DE, and CLK and gate timing control signals ST, GCLK, and MCLK for controlling an operation timing of a level shifter and a shift register of the gate driver 300.

The gate driver 300 outputs a gate pulse Gout using a gate timing control signal. The gate timing control signal includes a gate start pulse (GSP), a gate shift clock (GSC), and a gate output enable (GOE). The gate start pulse (GSP) indicates a starting line for the gate driver 300 to output a first gate pulse Gout. The gate shift clock (GSC) is a clock for shifting the gate start pulse (GSP). The gate output enable (GOE) sets an output period of the gate pulse Gout. The gate driver 300 may be implemented in the form of a gate-in-panel (GIP) including a combination of TFTs on the display panel 100.

The data driver 400 converts image data provided from the timing controller 200 into a data voltage.

Figure 3:
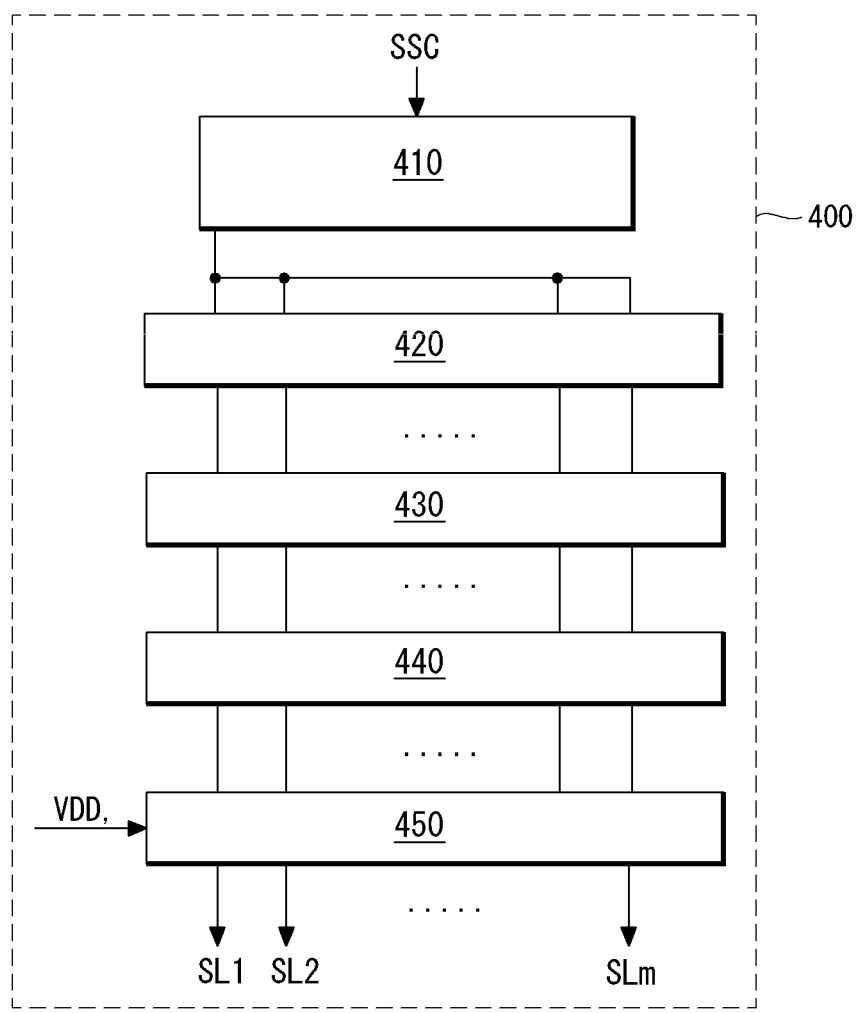
FIG. 3 is a view illustrating an example of a data driver.

FIG. 3 is a view illustrating a configuration of a data driver. Referring to FIG. 3, the data driver 400 includes a register unit 410, a first latch 420, a second latch 430, a digital-to-analog converter (DAC) 440, and an output unit 450. The register unit 410 samples RGB digital video data bits of the input image using data control signals SSC and SSP provided from the timing controller 200, and provides the sampled digital video data bits to the first latch 420. The first latch 420 samples and latches the digital video data bits according to clocks sequentially provided from the register unit 410, and simultaneously outputs the latched data. The second latch 430 latches data provided from the first latch 420 and simultaneously outputs latched data in response to a source output enable signal SOE. The DAC 440 converts video data input from the second latch unit 430 into a gamma compensation voltage GMA to generate an analog video data voltage. The output unit 450 provides an analog type data voltage ADATA output from the DAC 440 to the data lines DL during a low logical period of the source output enable signal SOE. The output unit 450 may be implemented as an output buffer outputting a data voltage using a low potential voltage GND and a voltage received through a high potential input terminal, as driving voltages.

The multiplexer 500 distributes data voltages output from output buffers to the plurality of data lines DL in a time division manner. In FIG. 1, an embodiment is depicted in which 3m number of data lines DL are connected to each output buffer. However, the number of data lines connected to the output buffers is not limited thereto. In some embodiments, the multiplexer is any switching device capable of selecting coupling an input to one or more of a plurality of outputs. In one embodiment the switching device is a switch having an input contact, an output contact, and a gate or state controller.

Figure 4:
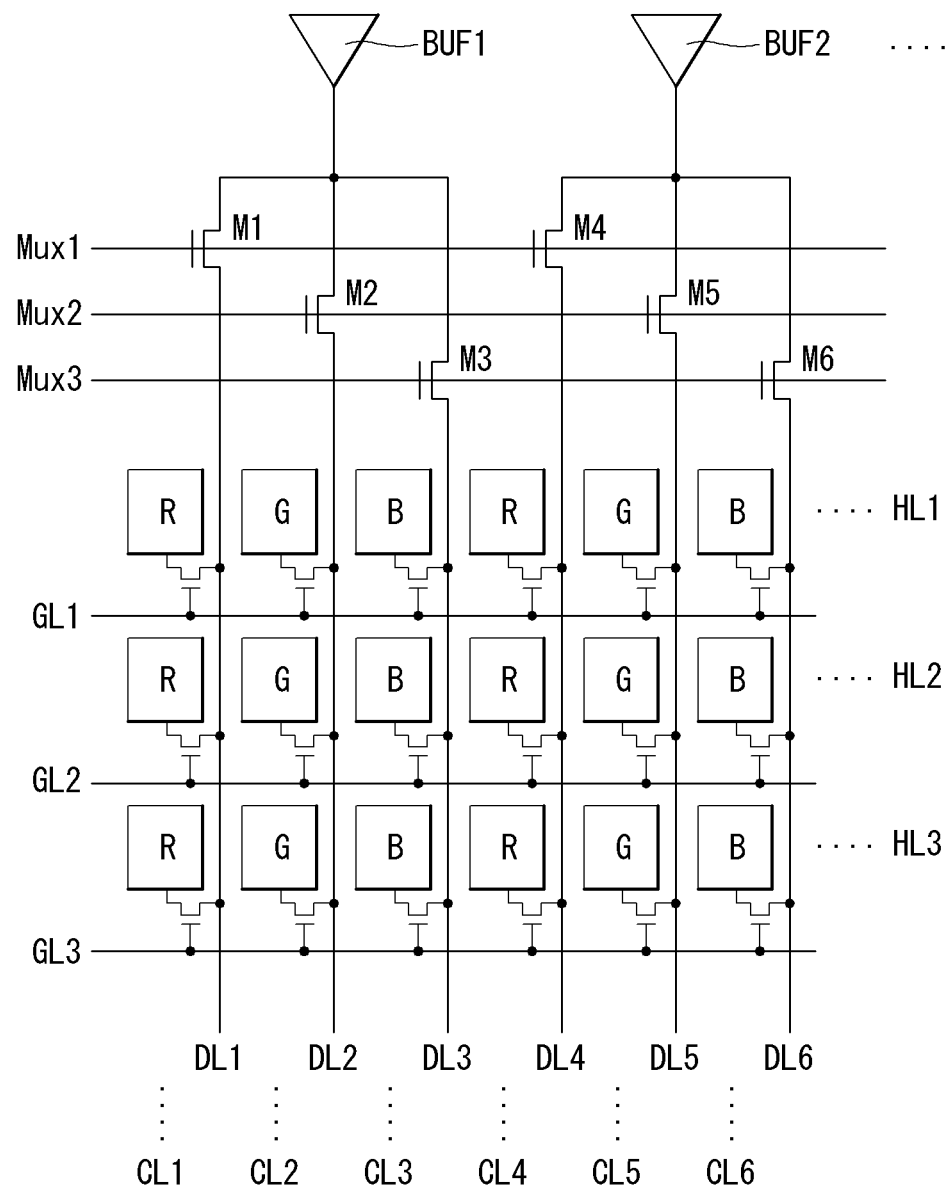
FIG. 4 is a view illustrating a structure of multiplexers and subpixel arrays according to a first embodiment of the present disclosure.
Figure 5:
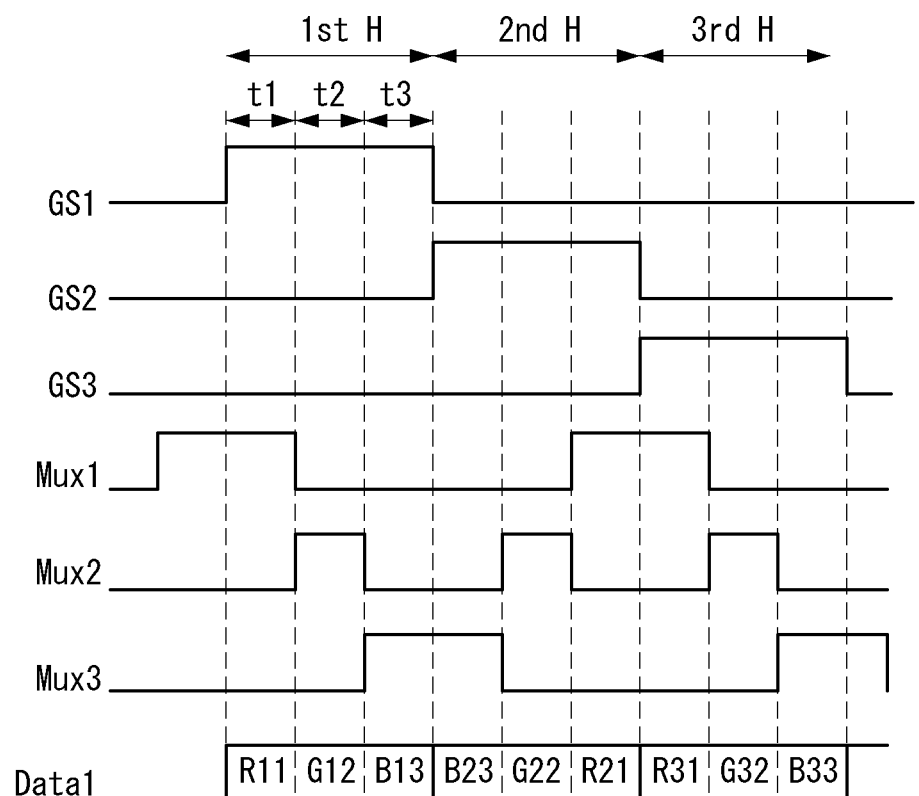
FIG. 5 is a view illustrating a timing of control signals according to the first embodiment of the present disclosure.

FIG. 4 is a view illustrating a structure of multiplexers and subpixel arrays according to a first embodiment of the present disclosure, and FIG. 5 is a view illustrating a timing of control signals and a gate pulse according to the first embodiment of the present disclosure.

Referring to FIGS. 4 and 5, the display panel 100 includes red subpixels R, green subpixels G, and blue subpixels B disposed in parallel in each pixel line HL. The subpixels disposed in each pixel line receive a gate pulse GS1 through the gate line GL. For example, subpixels P disposed in a first pixel line HL1 receive a first gate pulse GS1 through a first gate lines GL1. Also, subpixels P disposed in a second pixel line HL2 receive a second gate pulse GS2 through a second gate line GL2, and subpixels P disposed in a third pixel line HL3 receive a third gate pulse GS3 through a third gate line GL3.

In some embodiments, the different color subpixels R, G, and B are disposed in a repeating pattern. For example, in the last sequence, the red subpixels R are disposed in a (3m-2)th column line (CL[3m-2]), the green pixels G are disposed in a (3m-1)th column line (CL [3m-1]), and the blue subpixels B are disposed in a 3mth column line (CL3m). In this example, red subpixels R are disposed in a first column line CL1 and a fourth column line CL4. Green pixels G are disposed in a second column line CL2 and a fifth column line CL5. Also, blue subpixels B are disposed in a third column line CL3 and a sixth column line CL6.

The data driver 400 outputs a data voltage to three subpixels positioned in one pixel line HL during every horizontal period H. For example, a first output buffer BUF1 of the data driver 400 sequentially outputs a data voltage applied to R11, G12, and G13 during a first scan period t1 of the first horizontal period $1^{st}$ H. In this embodiment, R (or B or B)xy represents a color and a position of a subpixel. That is, Rab refers to a red subpixel positioned in a horizontal line a and a column line b. Thus, R11 refers to a red subpixel positioned in a first column line CL1 in the first pixel line HL1. Also, in FIG. 5, Data1 illustrates subpixels to which a data voltage output by the first output buffer BUF1 is applied. Also, the first horizontal period 1H may be defined as a period during which a data voltage is supplied to the subpixels P disposed in one pixel line HL. The data driver 400 supplies the data voltage to three subpixels during the first horizontal period 1H in a time division manner. Each of the first to third scan periods t1 to t3 of each horizontal period is defined as a period during which a data voltage applied to one subpixel P is output.

The multiplexer 500 distributes data voltages, which are output by the output buffers BUF, to a plurality of data lines. The multiplexer 500 according to the first embodiment distributes a data voltage output by the first output buffer BUF1 to first to third data lines DL1 to DL3 in a time division manner. To this end, the multiplexer 500 includes first to third switches M1, M2, and M3. The first switch M1 is turned on in response to a first control signal Mux1 to connect the first output buffer BUF1 and the first data line DL1. The second switch M2 is turned on in response to a second control signal Mux2 to connect the first output buffer and the second data line DL2, and the third switch M3 is turned on in response to a third control signal Mux3 to connect the first output buffer BUF1 and the third data line DL3.

The multiplexer controller 600 outputs the first to third control signals in a time division manner during one horizontal period H. The multiplexer controller 600 may sequentially output the first, second, and third control signals Mux1, Mux2, and Mux3 or sequentially output the third, second, and first control signals Mux3, Mux2, and Mux1, during one horizontal period. For example, the multiplexer controller 600 sequentially outputs the first to third control signals Mux1 to Mux3 during the first horizontal period $1^{st}$ H and sequentially outputs the third to first control signals Mux3 to Mux1 during a second horizontal period $2^{nd}$ H.

The first to third control signals Mux1 to Mux3 are sequentially output during each horizontal period H in which the gate pulse GS maintains a gate ON voltage. For example, during the first horizontal period 1H, the first gate pulse GS1 maintains the gate ON voltage and the first to third control signals Mux1 to Mux3 are sequentially output.

As a result, the subpixel R11 is charged during the first scan period t1 of the first horizontal period $1^{st}$ H, the subpixel G12 is charged during the second scan period t2 of the first horizontal period $1^{st}$ H, and the subpixel B13 is charged during the third scan period t3 of the first horizontal period $1^{st}$ H.

Also, the subpixel B23 is charged during a first scan period t1 of a second horizontal period $2^{nd}$ H, the subpixel G22 is charged during a second scan period t2 of the second horizontal period $2^{nd}$ H, and the subpixel R21 is charged during a third scan period t3 of the second horizontal period $2^{nd}$ H.

In this manner, in the first embodiment, the third control signal Mux3 is output during the final period of the first horizontal period $1^{st}$ H and the first period of the second horizontal period $2^{nd}$ H. That is, the number of times the third control signal Mux3 is reversed to a gate ON voltage and the number of times the third control signal Mux3 is reversed to a gate OFF voltage from the first horizontal period $1^{st}$ H to the second horizontal period $2^{nd}$ H are one time, respectively. Similarly, the number of times the first control signal Mux1 is reversed to a gate ON voltage and the number of times the first control signal Mux1 is reversed to a gate OFF voltage from the second horizontal period $2^{nd}$ H to the third horizontal period $3^{rd}$ H are one time, respectively.

As a result, overall transition number of the control signals Mux1 to Mux3 output by the multiplexer controller 600 is reduced, and thus, power consumption of the multiplexer controller 600 is reduced.

Figure 6:
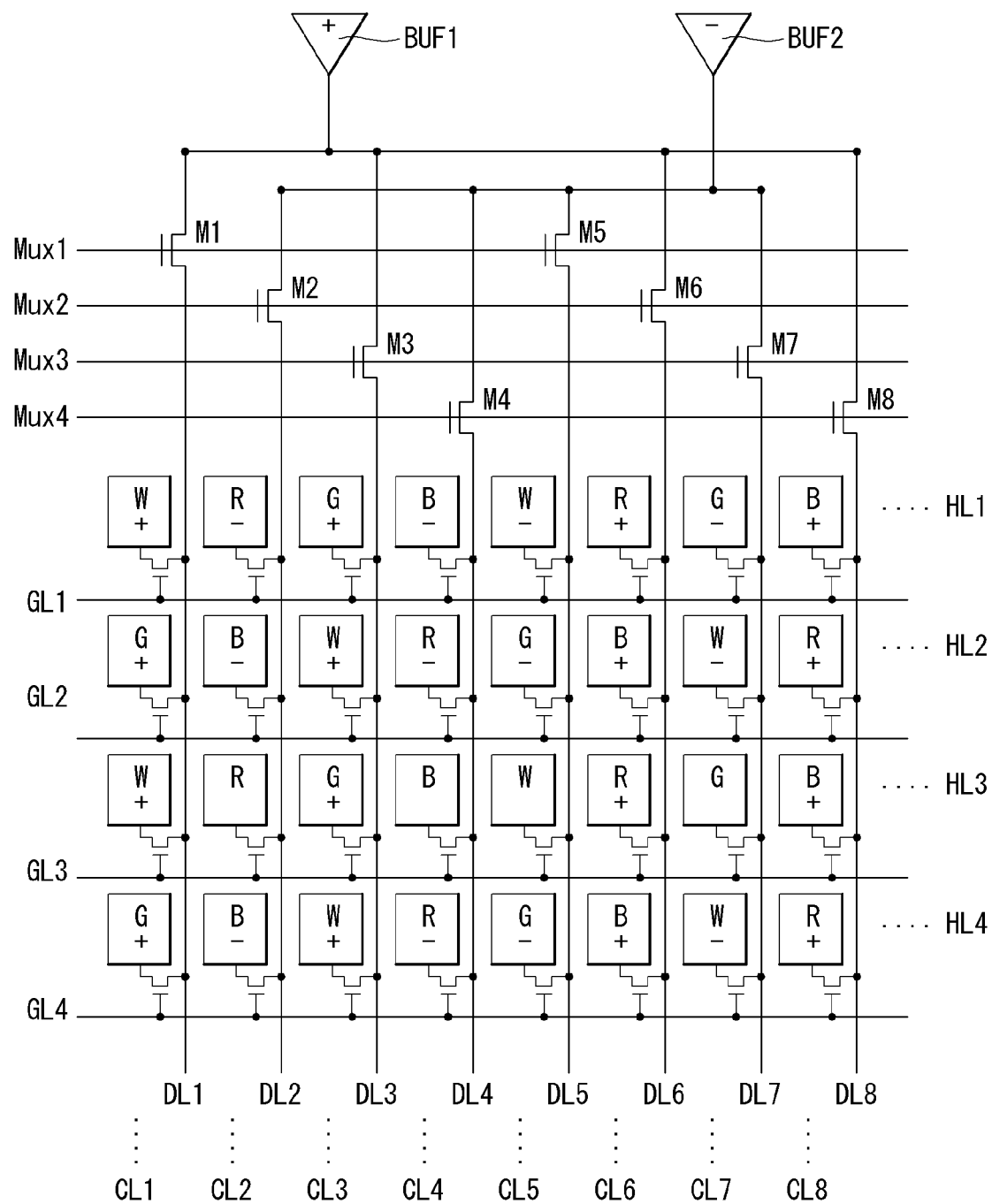
FIG. 6 is a view illustrating a structure of multiplexers and subpixel arrays according to a second embodiment of the present disclosure.
Figure 7:
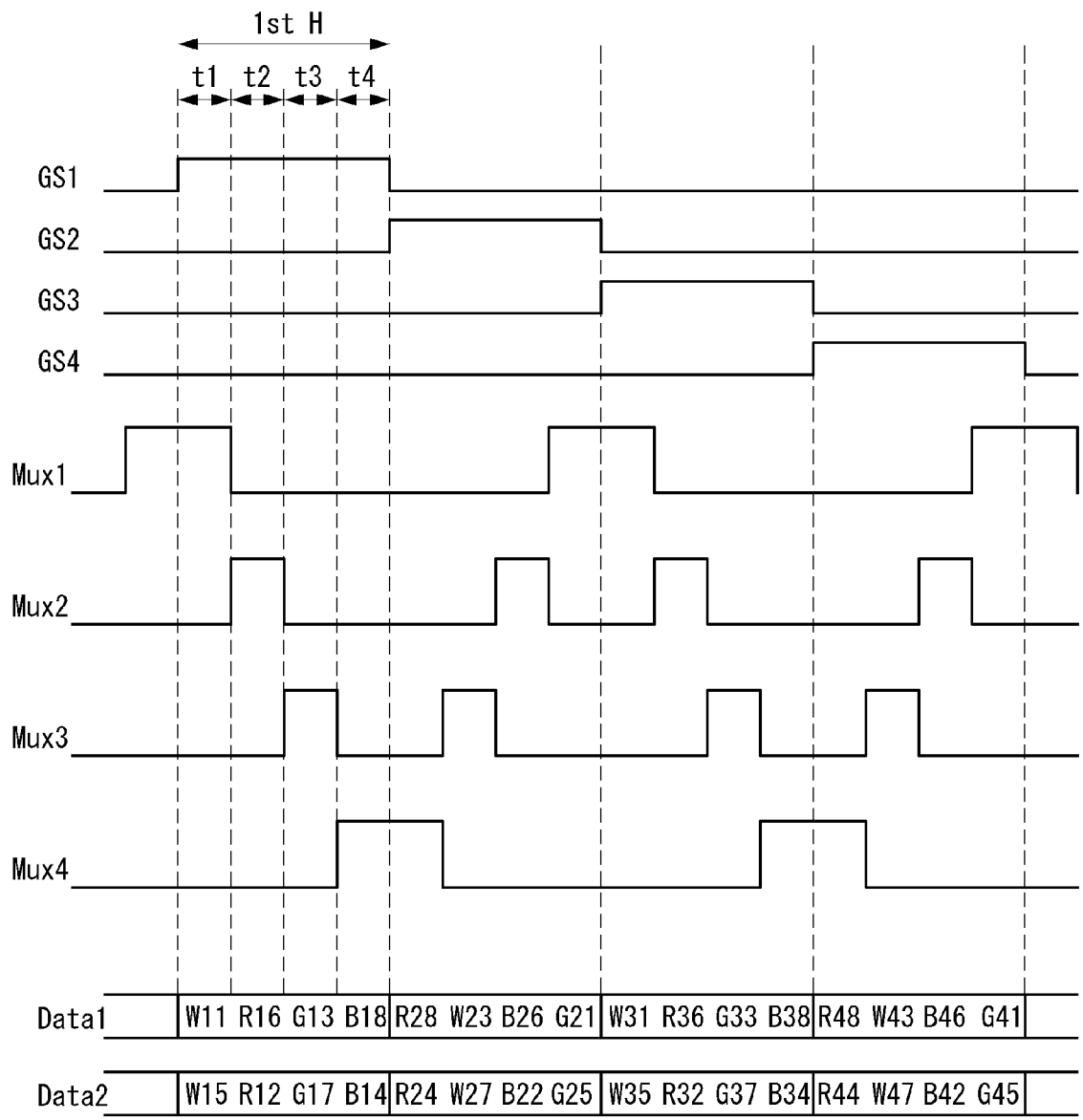
FIG. 7 is a view illustrating a timing of control signals according to the second embodiment of the present disclosure.

FIG. 6 is a view illustrating a structure of pixel arrays and multiplexers according to a second embodiment of the present disclosure, and FIG. 7 is a timing diagram of control signals and gate pulses according to the second embodiment of the present disclosure.

Referring to FIGS. 6 and 7, subpixels include a white subpixel W, a red subpixel R, a green subpixel G, and a blue subpixel B.

In odd-numbered pixel lines HL1 and HL3, W, R, G, and B subpixels are sequentially disposed, and in even-numbered pixel lines HL2 and HL4, G, B, W, and R subpixels are sequentially disposed. Thus, the W, R, G, and B subpixels disposed in parallel in each pixel line may form a unit pixel. Alternately, W, R, G, and B subpixels disposed in 2×2 unit may form a unit pixel. In image rendering of the display panel, one unit pixel may be used as a reference or two adjacent subpixels may be used as a reference.

The multiplexer 500 distributes data voltages, which are output by the output buffers BUFs, to a plurality of data lines. The multiplexer 500 distributes a positive (+) polarity data voltage, which is output by the first output buffer BUF1, to a first data line DL1, a third data line DL3, a sixth data line DL6, and an eight data line DL8 in a time division manner. Also, the multiplexer 500 distributes a negative (−) polarity data voltage, which is output by the second output buffer BUF2, to a second data line DL2, a fourth data line DL4, a fifth data line DL5, and a seventh data line DL7 in a time division manner. To this end, the multiplexer 500 includes first to eighth switches M1 to M8.

The first switch M1 is turned on in response to the first control signal Mux1 to connect the first output buffer BUF1 to the first data line DL1. The third switch M3 is turned on in response to the third control signal Mux3 to connect the first output buffer BUF1 to the third data line DL3. The sixth switch M6 is turned on in response to the second control signal Mux2 to connect the first output buffer BUF1 to the sixth data line DL6. The eighth switch M8 is turned on in response to the fourth control signal Mux4 to connect the first output buffer BUF1 to the eighth data line DL8.

The second switch M2 is turned on in response to the second control signal Mux2 to connect the second output buffer BUF2 to the second data line DL2. The fourth switch M4 is turned on in response to the fourth control signal Mux4 to connect the second output buffer BUF2 to the fourth data line DL4. The fifth switch M5 is turned on in response to the first control signal Mux1 to connect the second output buffer BUF2 to the fifth data line DL5. The seventh switch M7 is turned on in response to the third control signal Mux3 to connect the second output buffer BUF2 to the seventh data line DL7.

The multiplexer controller 600 outputs the first to fourth control signals Mux1 to Mux4 in a time division manner during one horizontal period 1H. The multiplexer controller 600 may sequentially output the first control signal Mux1 to the fourth control signal Mux4 or sequentially output the fourth control signal Mux4 to the first control signal Mux1 during one horizontal period. For example, the multiplexer controller 600 may sequentially output the first control signal Mux1 to the fourth control signal Mux4 during a first horizontal period $1^{st}$ H and sequentially output the fourth control signal Mux4 to the first control signal Mux1 during a second horizontal period $2^{nd}$ H.

Within one horizontal period 1H, the first control signal Mux1 to the fourth control signal Mux4 are output during one scan period 1t. Within each horizontal period H, each of first to fourth scan periods t1 to t4 is defined as a period during which a data voltage applied to one subpixel P is output.

The data driver 400 outputs data voltages having the opposite polarities through mutually adjacent output buffers. For example, the data driver 400 may output a positive (+) polarity data voltage to the output buffer BUF1 and output a negative (−) polarity data voltage to the second output buffer BUF2.

The data driver 400 outputs a data voltage to one pixel line HL during each horizontal period H. In FIG. 7, Data1 represents subpixels to which a data voltage output by the first output buffer BUF1 is applied, and Data2 represents subpixels to which a data voltage output by the second output buffer BUF2 is applied. That is, the first output buffer BUF1 of the data driver 400 sequentially outputs a data voltage supplied to subpixels positioned in a first column line CL1, a sixth column line CL6, a third column line CL3, and an eighth column line CL8 during each horizontal period H. The second output buffer BUF2 sequentially outputs a data voltage supplied to subpixels positioned in a fifth column line CL5, a second column line CL2, a seventh column line CL7, and a fourth column line CL4 during each horizontal period H.

As a result, a subpixel W11 and a subpixel W15 are charged during a first scan period t1 of the first horizontal period $1^{st}$ H. A subpixel R16 and a subpixel R12 are charted during a second scan period t2 of the first horizontal period $1^{st}$ H. A subpixel G13 and a subpixel G17 are charged during a third scan period t3 of the first horizontal period $1^{st}$ H. A subpixel B18 and a subpixel B14 are charged during a fourth scan period t4 of the first horizontal period $1^{st}$ H.

Since the same control signal is maintained at the gate ON voltage during the fourth scan period t4 of the first horizontal period $1^{st}$ H and during the first scan period t1 of the second horizontal period $2^{nd}$ H, power consumption of the multiplexer controller 600 may be reduced.

In the second embodiment having the RGBW structure, since subpixels of different colors are disposed in the same column line of adjacent pixel lines, a data voltage of a different color may be introduced in a section in which a gate pulse is reversed to a gate OFF voltage. For example, as illustrated in FIG. 7, the first output buffer BUF1 outputs a data voltage supplied to a subpixel B18 during a fourth scan period t4 of the first horizontal period $1^{st}$ H and outputs a data voltage supplied to a subpixel R28 during a first scan period t1 of the second horizontal period $2^{nd}$ H. Since the first gate pulse GS1 is reversed to a gate OFF voltage at a timing when the first horizontal period $1^{st}$ H expires, the subpixel B18 does not receive a data voltage during the second horizontal period $2^{nd}$ H. However, the first gate pulse GS1 may maintain the gate ON voltage even at an initial stage of the second horizontal period $2^{nd}$ H due to RC delay, and, as a result, the data voltage supplied to the subpixel R28 is mixed in the subpixel B18. Due to this, the subpixel B18 may not represent an intended gray level.

Figure 8:
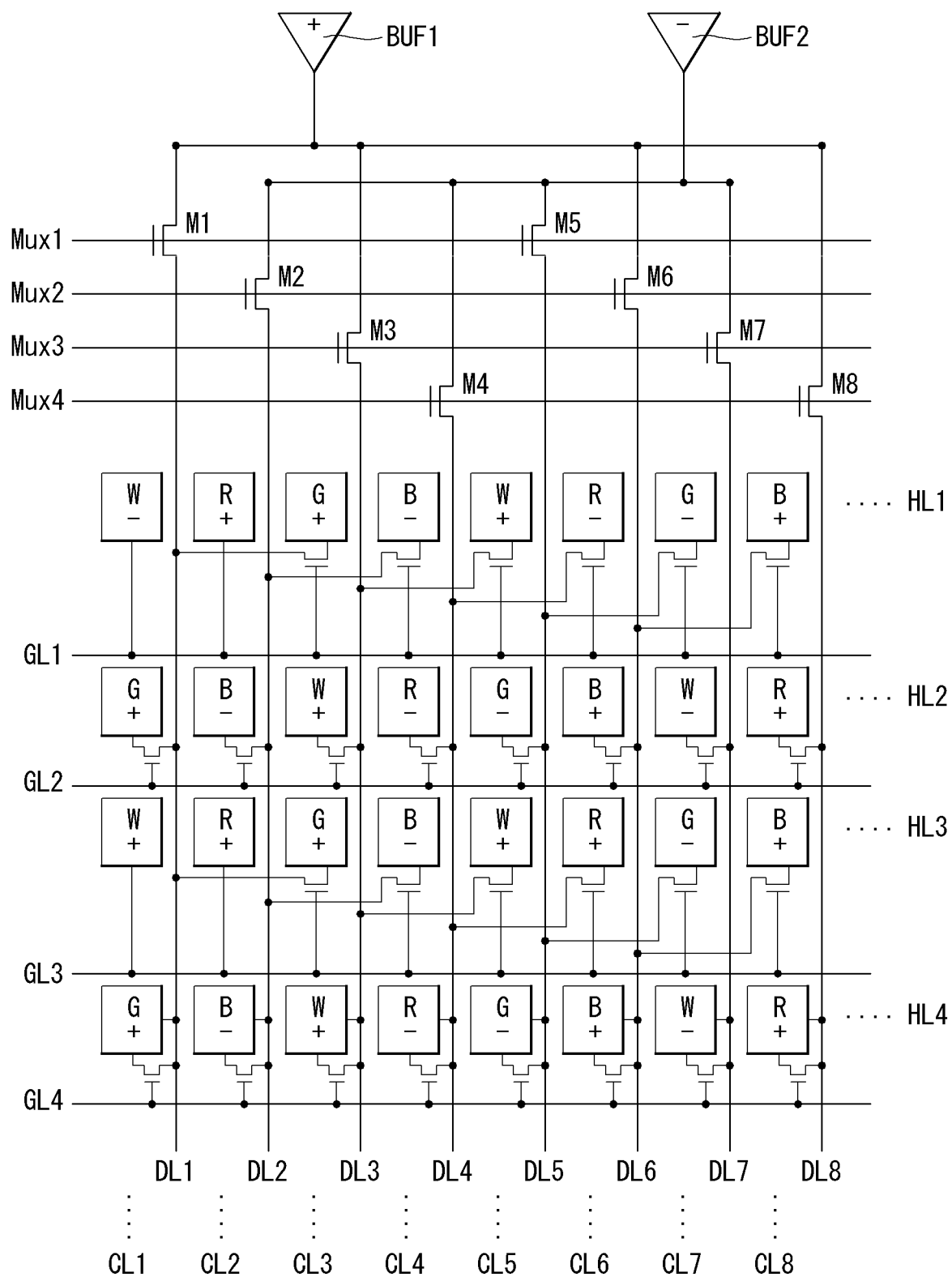
FIG. 8 is a view illustrating a structure of multiplexers and subpixel arrays according to a third embodiment of the present disclosure.

A third embodiment described hereinafter is to improve a degradation of display quality of an image caused as the data voltage is mixed due to RC delay of the gate pulse GS. FIG. 8 is a view illustrating a structure of pixel arrays and multiplexers according to a third embodiment of the present disclosure, and FIG. 9 is a view illustrating a timing of control signals and gate pulses according to the third embodiment of the present disclosure.

Referring to FIGS. 8 and 9, subpixels include a white subpixel W, a red subpixel R, a green subpixel G, and a blue subpixel B. In odd-numbered pixel lines HL1 and HL3, W, R, G, and B subpixels are sequentially disposed, and in even-numbered pixel lines HL2 and HL4, G, B, W, and R subpixels are sequentially disposed. Thus, the W, R, G, and B subpixels disposed in parallel in each pixel line may form a unit pixel. Alternately, W, R, G, and B subpixels disposed in 2×2 unit may form a unit pixel. In image rendering of the display panel, one unit pixel may be used as a reference or two adjacent subpixels may be used as a reference.

The multiplexer 500 distributes data voltages, which are output by the output buffers BUFs, to a plurality of data lines. The multiplexer 500 distributes a positive (+) polarity data voltage, which is output by the first output buffer BUF1, to a first data line DL1, a sixth data line DL6, a third data line DL3, and an eight data line DL8 in a time division manner. Also, the multiplexer 500 distributes a negative (−) polarity data voltage, which is output by the second output buffer BUF2, to a fifth data line DL5, a second data line DL2, a seventh data line DL7, and a fourth data line DL4 in a time division manner. To this end, the multiplexer 500 includes first to eighth switches M1 to M8.

The first switch M1 is turned on in response to the first control signal Mux1 to connect the first output buffer BUF1 to the first data line DL1. The sixth switch M6 is turned on in response to the second control signal Mux2 to connect the first output buffer BUF1 to the sixth data line DL6. The third switch M3 is turned on in response to the third control signal Mux3 to connect the first output buffer BUF1 to the third data line DL3. The eighth switch M8 is turned in response to the fourth control signal Mux4 to connect the first output buffer BUF1 to the eighth data line DL8.

The fifth switch M5 is turned on in response to the first control signal Mux1 to connect the second output buffer BUF2 to the fifth data line DL5. The second switch M2 is turned on in response to the second control signal Mux2 to connect the second output buffer BUF2 to the second data line DL2. The seventh switch M7 is turned in response to the third control signal Mux3 to connect the second output buffer BUF2 to the seventh data line DL7. The fourth switch M4 is turned on in response to the fourth control signal Mux4 to connect the second output buffer BUF2 to the fourth data line DL4.

The multiplexer controller 600 outputs the first to fourth control signals Mux1 to Mux4 in a time division manner during one horizontal period 1H. The multiplexer controller 600 may sequentially output the first control signal Mux1 to the fourth control signal Mux4 or sequentially output the fourth control signal Mux4 to the first control signal Mux1 during one horizontal period. For example, the multiplexer controller 600 may sequentially output the first control signal Mux1 to the fourth control signal Mux4 during a first horizontal period $1^{st}$ H and sequentially output the fourth control signal Mux4 to the first control signal Mux1 during a second horizontal period $2^{nd}$ H.

Within one horizontal period 1H, the first control signal Mux1 to the fourth control signal Mux4 are output during one scan period 1t. Within each horizontal period H, each of first to fourth scan periods t1 to t4 is defined as a period during which a data voltage applied to one subpixel P is output.

The data driver 400 outputs data voltages having the opposite polarities through mutually adjacent output buffers. For example, the data driver 400 may output a positive (+) polarity data voltage to the output buffer BUF1 and output a negative (−) polarity data voltage to the second output buffer BUF2.

The data driver 400 outputs a data voltage to one pixel line HL during each horizontal period H. In FIG. 9, Data1 represents subpixels to which a data voltage output by the first output buffer BUF1 is applied, and Data2 represents subpixels to which a data voltage output by the second output buffer BUF2 is applied. That is, the first output buffer BUF1 of the data driver 400 sequentially outputs a data voltage supplied to subpixels positioned in a first column line CL1, a sixth column line CL6, a third column line CL3, and an eighth column line CL8 during each horizontal period H. The second output buffer BUF2 sequentially outputs a data voltage supplied to subpixels positioned in a fifth column line CL5, a second column line CL2, a seventh column line CL7, and a fourth column line CL4 during each horizontal period H.

A connection relation between the subpixels and the data lines disposed on the display panel 100 according to the third embodiment is as follows. A subpixel W positioned in the first pixel line HL1 is connected to any one of the data lines DL applying a data voltage to a subpixel W positioned in the second pixel line HL2. A subpixel R positioned in the first pixel line HL1 is connected to any one of the data lines DL applying a data voltage to a subpixel R positioned in the second pixel line HL2. A subpixel G positioned in the first pixel line HL1 is connected to any one of the data lines DL applying a data voltage to a subpixel G positioned in the second pixel line HL2. A subpixel B positioned in the first pixel line HL1 is connected to any one of the data lines DL applying a data voltage to a subpixel B positioned in the second pixel line HL2.

In detail, in the odd-numbered pixel lines HL1 and HL3, the subpixel W is disposed in a (4k−3)th (k is a natural number of 2 or greater) column line CL(4k−3), the subpixel R is disposed in a (4k−2)th column line CL(4k−2), the subpixel G is disposed in a (4k−1)th column line CL(4k−1), and the subpixel B is disposed in the (4k)th column line 4k.

In the even-numbered pixels lines HL2 and HL4, the subpixel G is disposed in a (4k−3)th column line CL(4k−3), the subpixel B is disposed in a (4k−2)th column line CL(4k−2), the subpixel W is disposed in a (4k−1)th column line CL(4k−1), and the subpixel R is disposed in the (4k)th column line 4k. In FIG. 8, a structure of a transistor of subpixels disposed in the even-numbered pixel lines HL2 and HL4 is omitted. As illustrated in FIG. 2, ith subpixels disposed in the even-numbered pixel lines HL2 and HL4 may include a drain electrode connected to an ith data line, a gate electrode connected to a gate line, and a source electrode connected to a pixel electrode.

In the odd-numbered pixel lines HL1 and HL3, ith subpixels are connected to a (i−2)th data line. That is, ith subpixels include a transistor including a gate electrode connected to a gate line GL, a drain electrode connected to a (i−2)th data line, and a source electrode connected to a pixel electrode 1. As a result, the ith subpixels receive a data voltage through the (i−2)th data line in the odd-numbered pixel lines HL1 and HL3. For example, in the first pixel line HL1, a subpixel G13 positioned in the third column line CL3 receives a data voltage through the first data line DL1 and a subpixel B14 positioned in the fourth column line CL4 receives a data voltage through the second data line DL2.

Also, in FIG. 8, in the odd-numbered pixel lines HL1 and HL3, first and second subpixels may be regarded as dummy subpixels. For example, a subpixel W11 and a subpixel R12 of the first pixel line HL1 and a subpixel W31 and a subpixel R32 of the third pixel line HL3 may be regarded as dummy subpixels. Since the dummy subpixels W11, R12, W31, and R32 are not connected to data lines, the dummy subpixels are blind spots. Thus, the first and second column lines CL1 and CL2 in which the dummy subpixels W11, R12, W31, and R32 are disposed may be covered by a black matrix.

As a result, subpixels to which the first data voltage Data1, which is output by the first output buffer BUF1, is supplied are as follows.

During the first scan period t1 of the first horizontal period $1^{st}$ H, the first switch M1 connects the first output buffer BUF1 to the first data line DL1 in response to the first control signal Mux1. As a result, a data voltage supplied by the first output buffer BUF1 is applied to the subpixel G13 by way of the first data line DL1.

During the second scan period t2 of the first horizontal period $1^{st}$ H, the sixth switch M6 connects the first output buffer BUF1 to the sixth data line DL6 in response to the second control signal Mux2. As a result, the data voltage supplied by the first output buffer BUF1 is applied to the subpixel B18 by way of the sixth data line DL6.

During the third scan period t3 of the first horizontal period $1^{st}$ H, the third switch M3 connects the first output buffer BUF1 to the third data line DL3 in response to the third control signal Mux3. As a result, the data voltage supplied by the first output buffer BUF1 is applied to the subpixel W15 by way of the third data line DL3.

During the fourth scan period t4 of the first horizontal period $1^{st}$ H, the eighth switch M8 connects the first output buffer BUF1 to the eighth data line DL8 in response to the fourth control signal Mux4. As a result, the data voltage supplied by the first output buffer BUF1 is applied to the subpixel R10 by way of the eighth data line DL8 (not shown).

During the first scan period t1 of the second horizontal period $2^{nd}$ H, the eighth switch M8 connects the first output buffer BUF1 to the eighth data line DL8 in response to the fourth control signal Mux4. As a result, the data voltage supplied by the first output buffer BUF1 is applied to the subpixel R28 by way of the eighth data line DL8.

Subpixels to which the second data voltage Data2, which is output by the second output buffer BUF2, is supplied are as follows.

During the first scan period t1 of the first horizontal period 1$^{st}$ H, the fifth switch M5 connects the second output buffer BUF2 to the fifth data line DL5 in response to the first control signal Mux1. As a result, a data voltage supplied by the second output buffer BUF2 is applied to the subpixel G17 by way of the fifth data line DL5.

During the second scan period t2 of the first horizontal period 1$^{st}$ H, the second switch M2 connects the second output buffer BUF2 to the second data line DL2 in response to the second control signal Mux2. As a result, the data voltage supplied by the second output buffer BUF2 is applied to the subpixel B14 by way of the second data line DL2.

During the third scan period t3 of the first horizontal period 1$^{st}$ H, the seventh switch M7 connects the second output buffer BUF2 to the seventh data line DL7 in response to the third control signal Mux3. As a result, the data voltage supplied by the second output buffer BUF2 is applied to the subpixel W19 by way of the seventh data line DL7.

During the fourth scan period t4 of the first horizontal period 1$^{st}$ H, the fourth switch M4 connects the second output buffer BUF2 to the fourth data line DL4 in response to the fourth control signal Mux4. As a result, the data voltage supplied by the second output buffer BUF2 is applied to the subpixel R16 by way of the fourth data line DL4.

During the first scan period t1 of the second horizontal period 2$^{nd}$ H, the fourth switch M4 connects the second output buffer BUF2 to the fourth data line DL4 in response to the fourth control signal Mux4. As a result, the data voltage supplied by the second output buffer BUF2 is applied to the subpixel R24 by way of the fourth data line DL4.

As described above, in the display device according to the third embodiment, the subpixels of the same color are connected to each data line. For example, during the fourth scan period r4 of the first horizontal period 1$^{st}$ H and during the first scan period t1 of the second horizontal period 2$^{nd}$ H, the first output buffer BUF1 supplies a data voltage to the subpixel R. Thus, although the data voltage applied to the subpixel R10 and the subpixel R28 is supplied during the first scan period t1 of the second horizontal period 2$^{nd}$ H due to delay of the first gate pulse GS1, the data voltage written to the subpixel R10 is rarely changed. This is because, since the subpixel R10 and the subpixel R28 are positioned to be very close to each other, there is a high possibility that the same or very similar data voltage is supplied to the subpixel R10 and the subpixel R28.

In this manner, when one control signal maintains the gate ON voltage in a continuous scan period, although a different data voltage is mixed in a subpixel due to delay of the gate pulse GS, a degradation of display quality may be improved.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display device, comprising:
a display panel on which first to nth color subpixels are disposed, wherein n is a natural number;
a data driver outputting a plurality of data voltages, each data voltage to be supplied to the first to nth color subpixels, through output buffers;
a multiplexer distributing each of the plurality of data voltages output by the output buffers to four data lines in a time division manner in response to first to nth control signals; and
a multiplexer controller sequentially outputting the first control signal to the nth control signal during a first horizontal period, and sequentially outputting the nth control signal to the first control signal during a second horizontal period, wherein the nth control signal is maintained at a same level during a transition from the first horizontal period to the second horizontal period,
wherein the first and second horizontal periods include first to nth scan periods in sequence and each having a similar duration, and
a subpixel receiving a data voltage output during the nth scan period of the first horizontal period and a subpixel receiving a data voltage output during the first scan period of the second horizontal period are subpixels of the same color,
wherein the data driver includes: a first output buffer outputting a positive polarity data voltage and a second output buffer outputting a negative polarity data voltage,
the multiplexer includes: a first switch, a third switch, a sixth switch, and an eighth switch distributing a data voltage from the first output buffer to a first data line, a third data line, a sixth data line, and an eighth data line, respectively, in a time division manner, and a second switch, a fourth switch, a fifth switch, and a seventh switch distributing a data voltage from the second output buffer to a second data line, a fourth data line, a fifth data line, and a seventh data line, respectively, in a time division manner, and
the multiplexer controller outputs:
a first control signal controlling the first and fifth switching elements;
a second control signal controlling the second and sixth switches;
a third control signal controlling the third and seventh switches; and
a fourth control signal controlling the fourth and eighth switches,
wherein the display device, further comprising:
a first pixel line and a second pixel line, the first and second pixel lines each including a subpixel W, a subpixel R, a subpixel G, and a subpixel B for each color, subpixels of different colors being disposed in the same column line of the first pixel line and the second pixel line;

a subpixel W positioned in the first pixel line is connected to any one of data lines applying a data voltage to a subpixel W positioned in the second pixel line;

a subpixel R positioned in the first pixel line is connected to any one of the data lines applying a data voltage to a subpixel R positioned in the second pixel line;

a subpixel G positioned in the first pixel line is connected to any one of the data lines applying a data voltage to a subpixel G positioned in the second pixel line; and a subpixel B positioned in the first pixel line is connected to any one of the data lines applying a data voltage to a subpixel B positioned in the second pixel line.

2. The display device of claim 1, wherein in a first pixel line a subpixel W is disposed in a column line defined by the formula <column=4k−3>, in which k is an integer of 2 or greater, a subpixel R is disposed in a column line defined by the formula <column=4k−2>, a subpixel G is disposed in a column line defined by the formula <column=4k−1>, and a subpixel B is disposed in a column line defined by the formula <column=4k>; and in a second pixel line a subpixel G is disposed in a column line defined by the formula <column=4k−3>, a subpixel B is disposed in a column line defined by the formula <column=4k−2>, a subpixel W is disposed in a column line defined by the formula <column=4k−1>, and a subpixel R is disposed in a column line defined by the formula <column=4k>.

3. The display device of claim 2, wherein the subpixel G disposed in the (4k−1)th column line in the first pixel line and the subpixel G disposed in the (4k−3)th column line in the second pixel line receive a data voltage through the same data line, the subpixel B disposed in the (4k)th column line in the first pixel line and the subpixel B disposed in the (4k−2)th column line in the second pixel line receive a data voltage through the same data line, the subpixel W disposed in the (4k−3)th column line in the first pixel line and the subpixel W disposed in the (4k−1)th column line in the second pixel line receive a data voltage through the same data line, and the subpixel R disposed in the (4k−2)th column line in the first pixel line and the subpixel R disposed in the (4k)th column line in the second pixel line receive a data voltage through the same data line.

4. The display device of claim 3, wherein i subpixels disposed in the second pixel line are connected to i data lines, respectively, i being an integer of 3 or greater; and i subpixels disposed in the first pixel line include a transistor including a gate electrode connected to a first gate line, a drain electrode connected to an (i−2) data line, and a source electrode connected to a pixel electrode of the subpixels.

5. A device, comprising:

a display panel having a first plurality of subpixels and a second plurality of subpixels, the first plurality of subpixels positioned in a first position order based on subpixel color, the second plurality of subpixels positioned in a second position order based on subpixel color;

a switching device having a data input, a state control input, and a plurality of outputs, the data input coupled to a data line, each one of the plurality of outputs coupled to one of the first plurality of subpixels or one of the second plurality of subpixels, respectively; and a switch controller having a state control output coupled to the state control input, the switch controller configured to activate the first plurality of subpixels in a first activation order based on color during a first horizontal period sequentially and to activate the second plurality of subpixels in a second activation order based on color during a second horizontal period sequentially with the state control output, the first activation order is opposite of the second activation order, wherein the state control output is maintained at a same level during a transition from the first horizontal period to the second horizontal periods wherein a data voltage input to the data input has a positive polarity data voltage and a negative polarity data voltage, the switching device includes: a first switch, a third switch, a sixth switch, and an eighth switch distributing the positive polarity data voltage to a first data line, a third data line, a sixth data line, and an eighth data line, respectively, in a time division manner, and a second switch, a fourth switch, a fifth switch, and a seventh switch distributing the negative polarity data voltage to a second data line, a fourth data line, a fifth data line, and a seventh data line, respectively, in a time division manner, and the switch controller outputs: a first control signal controlling the first and fifth switching elements; a second control signal controlling the second and sixth switches; a third control signal controlling the third and seventh switches; and a fourth control signal controlling the fourth and eighth switches, wherein the display device, further comprising:

a first and second plurality of subpixels each including a subpixel W, a subpixel R, a subpixel G, and a subpixel B for each color, subpixels of different colors being disposed in the same column line of the first and second plurality of subpixels; a subpixel W of the first plurality of subpixels is connected to any one of data lines applying a data voltage to a subpixel W of the second plurality of subpixels; a subpixel R of the first plurality of subpixels is connected to any one of the data lines applying a data voltage to a subpixel R of the second plurality of subpixels; a subpixel G of the first plurality of subpixels is connected to any one of the data lines applying a data voltage to a subpixel G of the second plurality of subpixels; and a subpixel B of the first plurality of subpixels is connected to any one of the data lines applying a data voltage to a subpixel B of the second plurality of subpixels.

6. The device of claim 5, wherein the first plurality of subpixels includes a first subpixel having a first color and a second subpixel having a second color, and the second plurality of subpixels includes a third subpixel having the first color and a fourth subpixel having the second color, the first activation order including the first color followed by the second color and the second activation order including the second color followed by the first color.

7. The device of claim 6, wherein the first plurality of subpixels includes a fifth subpixel having a third color, and the second plurality of subpixels includes a sixth subpixel having the third color.

8. The device of claim 7, wherein the first activation order includes the first color first, the second color second, and the third color third, and the second activation order includes the first color third, the second color second, and the third color first.

9. The device of claim 7, wherein the state control output of the switch controller includes first, second, and third control outputs, and the switching device includes:
- a first switch having a gate coupled to the first control output of the switch controller and an output coupled to first and third subpixels;
- a second switch having a gate coupled to the second control output of the switch controller and an output coupled to second and fourth subpixels; and
- a third switch having a gate coupled to the third control output of the switch controller and an output coupled to fifth and sixth subpixels.

10. The device of claim 7, wherein the first color is red, the second color is green, and the third color is blue.

11. The device of claim 7, wherein the first plurality of subpixels includes a seventh subpixel having a fourth color, and the second plurality of subpixels includes an eighth subpixel having the fourth color.

12. The device of claim 11, wherein the state control output of the switch controller includes first, second, third, and fourth control outputs, and the switching device includes:
- a first switch having a gate coupled to the first control output of the switch controller and an output coupled to first and third subpixels;
- a second switch having a gate coupled to the second control output of the switch controller and an output coupled to second and fourth subpixels;
- a third switch having a gate coupled to the third control output of the switch controller and an output coupled to fifth and sixth subpixels; and
- a fourth switch having a gate coupled to the fourth control output of the switch controller and an output coupled to seventh and eighth subpixels.

13. The device of claim 12, wherein the first activation order includes the first color first, the second color second, the third color third, and the fourth color fourth, and the second activation order includes the first color second, the second color first, the third color fourth, and the fourth color third.

14. The device of claim 11, wherein the first color is white, the second color is red, the third color is green, and the fourth color is blue.

* * * * *